US009909515B2

United States Patent
Brinkmann et al.

(10) Patent No.: US 9,909,515 B2
(45) Date of Patent: Mar. 6, 2018

(54) ENHANCED TRACTIVE POWER AT LOW SPEEDS

(71) Applicant: Ford Global Technologies, LLC, Dearborn, MI (US)

(72) Inventors: Bernd Brinkmann, Dormagen (DE); Khizer Tufail, London (GB); Alain Evrard, Oxted (GB); Matthew Barber, Chelmsford (GB); Slavenko Vukovic, Bruehl (DE); Ralph Maiwald, Cologne (DE); Paul Crossley, Danbury (GB)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 14/328,615

(22) Filed: Jul. 10, 2014

(65) Prior Publication Data

US 2015/0020775 A1 Jan. 22, 2015

(30) Foreign Application Priority Data

Jul. 17, 2013 (DE) .................. 10 2013 214 030

(51) Int. Cl.
*F02D 41/00* (2006.01)
*F01P 7/16* (2006.01)

(52) U.S. Cl.
CPC .......... *F02D 41/0002* (2013.01); *F01P 7/167* (2013.01); *F02D 41/0007* (2013.01);
(Continued)

(58) Field of Classification Search
CPC ...... F02D 41/00; F02D 41/001; F02D 41/002; F02D 41/0002; F02D 41/1401;
(Continued)

(56) References Cited

U.S. PATENT DOCUMENTS 4,572,135 A 2/1986 Nakajima et al.
4,648,357 A * 3/1987 Hayashi .................. F01P 11/02
123/41.27
(Continued)

FOREIGN PATENT DOCUMENTS

CN 1675456 A 9/2005
CN 1701169 A 11/2005
(Continued)

OTHER PUBLICATIONS

Anonymous, "Intelligent Auxiliary Water Heater Pump Control for Automotive Applications," IPCOM No. 000138732, Published Jul. 31, 2006, 3 pages.
(Continued)

*Primary Examiner* — John Kwon
*Assistant Examiner* — Johnny H Hoang
(74) *Attorney, Agent, or Firm* — Julia Voutyras; McCoy Russell LLP

(57) ABSTRACT

A method is disclosed for operating an internal combustion engine in which a coolant temperature of an engine coolant of the internal combustion engine is determined and is compared with a predetermined threshold temperature. If the coolant temperature is higher than the predetermined threshold temperature, a thermal input into the engine coolant is reduced by changing at least one operating parameter of the internal combustion engine. This can be done, for example, by raising a charging pressure of the internal combustion engine.

12 Claims, 3 Drawing Sheets

(52) U.S. Cl.
CPC .... *F01P 2025/42* (2013.01); *F02D 2200/021* (2013.01); *F02D 2200/0406* (2013.01); *F02D 2200/0414* (2013.01); *F02D 2250/18* (2013.01); *Y02T 10/144* (2013.01)

(58) Field of Classification Search
CPC ......... F02D 41/1454; F02D 2200/0414; F02D 2200/0614; F02D 2200/021; F02D 2200/022; F02B 29/0418; F02B 29/0437; Y02T 10/121; Y02T 10/144; Y02T 10/146; Y02T 10/16
USPC ........ 123/41.01, 41.05, 41.12, 435; 701/103, 701/104
See application file for complete search history.

(56) References Cited

U.S. PATENT DOCUMENTS

| | | | | |
|---|---|---|---|---|
| 6,167,703 | B1* | 1/2001 | Rumez | F02B 29/0418 60/599 |
| 8,826,893 | B2* | 9/2014 | Marsh | F01P 3/20 123/41.29 |
| 2003/0074117 | A1* | 4/2003 | Oki | F01P 11/14 701/33.9 |
| 2004/0181333 | A1* | 9/2004 | Tsukamoto | F01P 11/16 701/114 |
| 2005/0229908 | A1* | 10/2005 | Kuzuyama | F02D 35/025 123/552 |
| 2007/0129874 | A1* | 6/2007 | Bays | F01P 7/04 701/102 |
| 2010/0258096 | A1* | 10/2010 | Frank | F02B 29/0443 123/563 |
| 2012/0003510 | A1* | 1/2012 | Eisenhour | H01M 10/625 429/50 |
| 2012/0180768 | A1* | 7/2012 | Marsh | F01P 3/20 123/542 |
| 2012/0240575 | A1* | 9/2012 | Mori | F02G 5/00 60/616 |
| 2012/0290193 | A1* | 11/2012 | Suzuki | F02D 13/0261 701/103 |
| 2012/0324911 | A1* | 12/2012 | Shedd | F25B 25/00 62/62 |
| 2013/0204510 | A1* | 8/2013 | Brinkmann | F02D 41/00 701/103 |
| 2014/0123917 | A1* | 5/2014 | Chellan | F01P 7/10 123/41.04 |
| 2014/0208739 | A1* | 7/2014 | Mischler | F02M 25/0706 60/602 |
| 2014/0290631 | A1* | 10/2014 | Henry | F02M 25/0738 123/568.12 |

FOREIGN PATENT DOCUMENTS

| | | |
|---|---|---|
| CN | 102089509 A | 6/2011 |
| CN | 102852657 A | 1/2013 |
| CN | 103874833 A | 6/2014 |
| DE | 19961290 A1 | 6/2001 |
| DE | 102010017790 A1 | 1/2012 |
| GB | 2499093 A | 8/2013 |
| JP | 2547566 B2 | 10/1996 |
| JP | 2652406 B2 | 9/1997 |
| JP | H10141098 A | 5/1998 |
| JP | 2002310046 A | 10/2002 |
| JP | 2006291894 A | 10/2006 |
| JP | 2009103055 A | 5/2009 |
| WO | 9915769 A1 | 4/1999 |

OTHER PUBLICATIONS

Translation of "Aufladung der Verbrennungskraftmaschine," Hiereth, Hermann et al., "Charging the Internal Combustion Enginge," Lavanttal: Springer-Verlag, Wien, 2003, pp. 7-9 and 212, 213 in original German book.
State Intellectual Property Office of the People's Republic of China, Office Action and Search Report Issued in Application No. 201410338908.3, dated Dec. 22, 2017, 8 pages. (Submitted with Partial Translation).

* cited by examiner

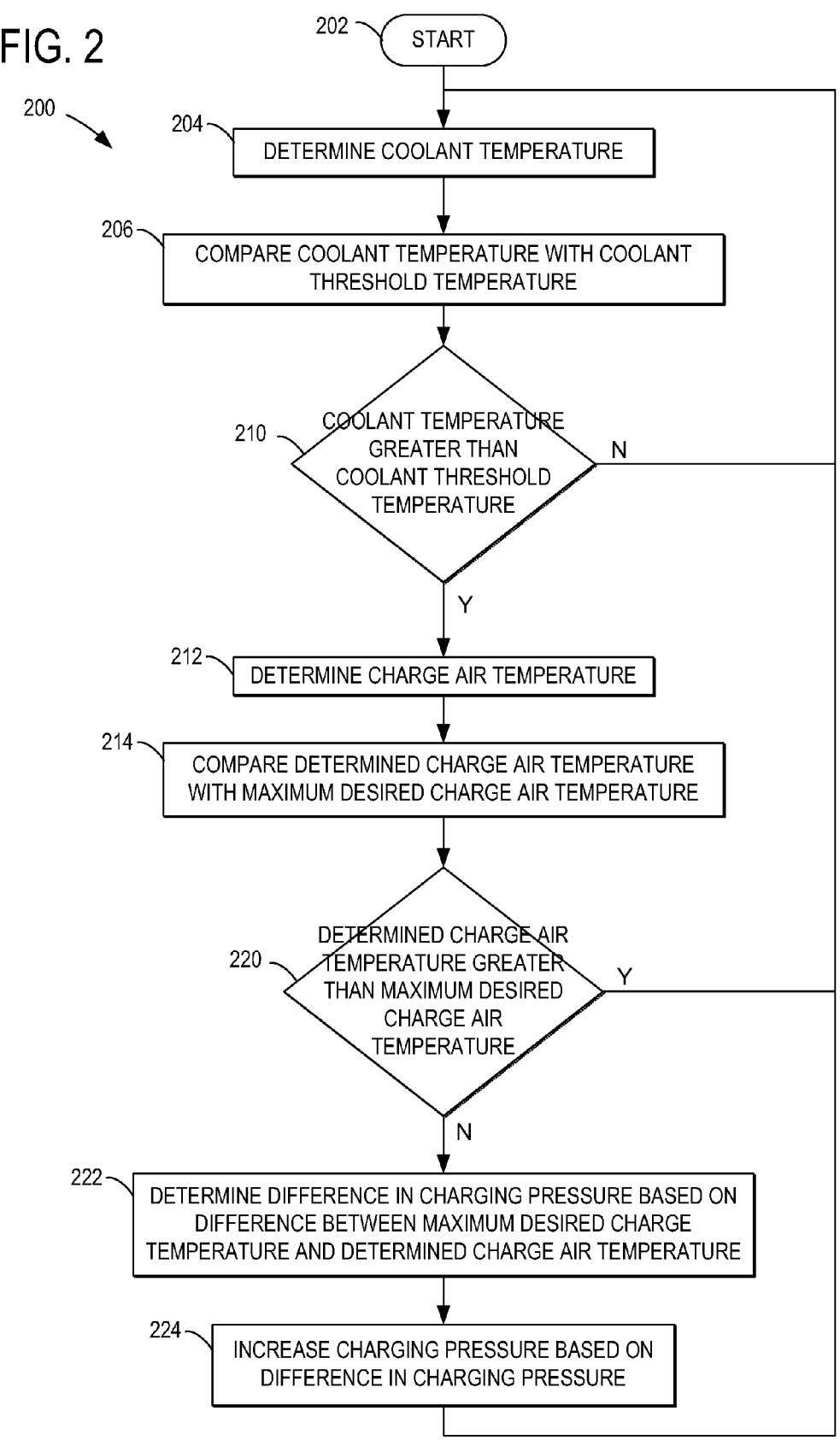

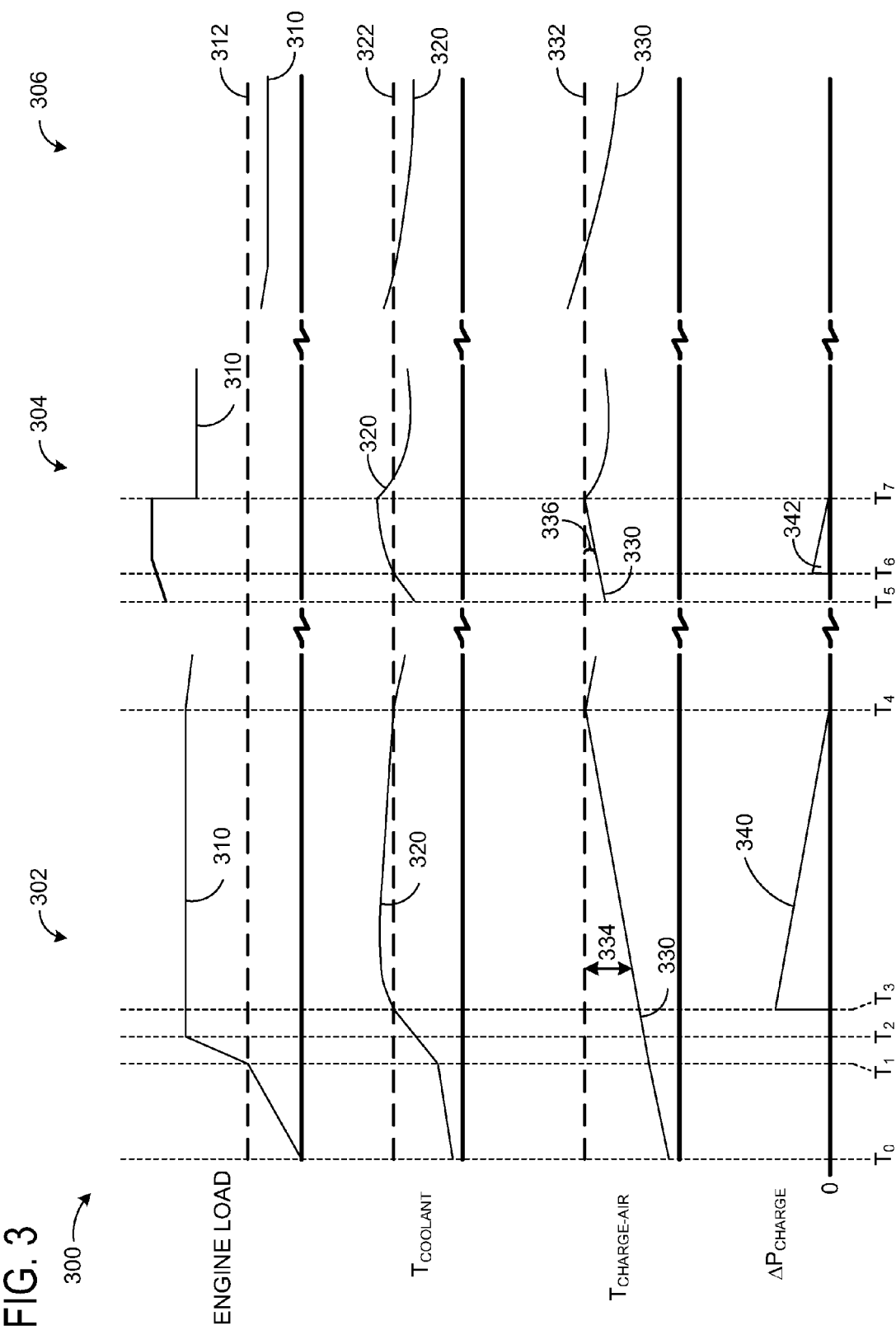

ENHANCED TRACTIVE POWER AT LOW SPEEDS

CROSS REFERENCE TO RELATED APPLICATIONS

The present application claims priority to German Patent Application No. 102013214030.4, filed Jul. 17, 2013, the entire contents of which are hereby incorporated by reference for all purposes.

FIELD

The present description relates to a method for operating an internal combustion engine, to an internal combustion engine which operates according to the method, and to a motor vehicle having such an internal combustion engine.

BACKGROUND AND SUMMARY

An internal combustion engine such as a combustion engine of a motor vehicle generates a considerable quantity of heat during operation, which heat has to be conducted away from the internal combustion engine so that the operating temperature of the internal combustion engine does not increase above a maximum permissible temperature. If the maximum permissible temperature is exceeded, the engine power of the internal combustion engine must be lowered or the internal combustion engine must be stopped completely. In order to conduct away the heat from the internal combustion engine, the internal combustion engine is cooled with an engine coolant. The engine coolant, frequently water, is for this purpose pumped in a closed circuit through lines in the wall of the internal combustion engine where it absorbs some of the operational heat and in the process heats up. The heated engine coolant is subsequently conducted through a radiator where it outputs the absorbed heat into the surroundings. The radiator is usually arranged in a motor vehicle in such a way that there is a flow of relative wind through it, which flow is heated in the process and outputs the excess heat in this way to the surroundings.

In this context there is a problem that the cooling power of the radiator is variable. The cooling power of the radiator is determined not only by the difference between the respective variable temperatures of the engine coolant and of the ambient air but, in particular, by the velocity of the motor vehicle and therefore by the air mass flow rate through the radiator. The slower a motor vehicle travels, the less air flows through the radiator and therefore the lower the cooling power thereof. If, despite the low speed, the motor vehicle travels under high load, for example when traveling uphill with a heavy cargo as a result of a trailer, the radiator can no longer conduct away the operational heat which is produced, even with additional forced cooling by a radiator fan. This leads, as described above, to engine power having to be reduced or the internal combustion engine having to be stopped. As a result, the capability of the motor vehicle to move a heavy trailer load is thereby restricted.

The inventors herein have recognized issues with these approaches and herein disclose a method and device which permits a motor vehicle to move a larger trailer load. For example, when the method is implemented in an internal combustion engine of a vehicle, the method comprises determining a coolant temperature of an engine coolant of the internal combustion engine; comparing the coolant temperature with a predetermined threshold temperature; and reducing a thermal input into the engine coolant by changing at least one operating parameter of the internal combustion engine responsive to a coolant temperature higher than the predetermined threshold temperature. In one particular example described, a controller of a vehicle may be configured to increase a charging pressure of the internal combustion engine to reduce the thermal input into the engine coolant in response to a coolant temperature above the temperature threshold. The method further comprises determining a charge air temperature of a charge air of the internal combustion engine, and increasing the charge air pressure of the internal combustion engine based on the charge air temperature relative to a maximum charge air temperature. In this way, the technical result is achieved that a motor vehicle may operate under a heavy load, e.g., to move a heavy trailer load, without having to reduce an engine power.

The present disclosure has the further advantage that the thermal input from the internal combustion engine into the engine coolant is reduced by virtue of the fact that the internal combustion engine is operated according to changed operating parameters. However, as disclosed herein, the at least one operating parameter is changed in such a way that less heat is produced in the internal combustion engine while the engine power of the internal combustion engine is maintained at least virtually without modification. Therefore, although the instantaneous engine power may fall or rise as a result of the change in the at least one operating parameter, compensations may also be made, for example, by changing another operating parameter or by a control measure by the driver of the motor vehicle, that produces the result that the engine power remains approximately the same responsive to the change of the operating parameter.

In the example described, the thermal input into the engine coolant may be reduced by raising a charging pressure of the internal combustion engine. Increasing the charging pressure results in an increased mass flow through the internal combustion engine since the combustion air is compressed to a greater degree. In this way, a larger mass of air enters the internal combustion engine and correspondingly applies a greater cooling effect to the engine. That is, when the charging pressure is increased the temperature of the exhaust gas is also lowered, which may act to cool the engine.

In this context, a charge air temperature of a charge air of the internal combustion engine may be determined and the charging pressure of the internal combustion engine may be increased as a function of the charge air temperature. By determining the charge air temperature, it is possible to detect how far the charge air temperature is below a maximum desired charge air temperature (e.g., a maximum operating temperature threshold). By compressing the sucked-in air, the temperature of the air is increased. Therefore, the charge air temperature is also increased accordingly when the charging pressure of the internal combustion engine is increased. As such, in order to avoid increasing the charge air temperature to an undesirably large degree, it is advantageous to determine the charge air temperature and to increase the charging pressure as a function of the determined charge air temperature.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 2 shows a flow chart of an exemplary embodiment of a method according to the present disclosure for operating an internal combustion engine; and FIG. 3 shows simulated operating sequences according to the method.

DETAILED DESCRIPTION

Figure 1:
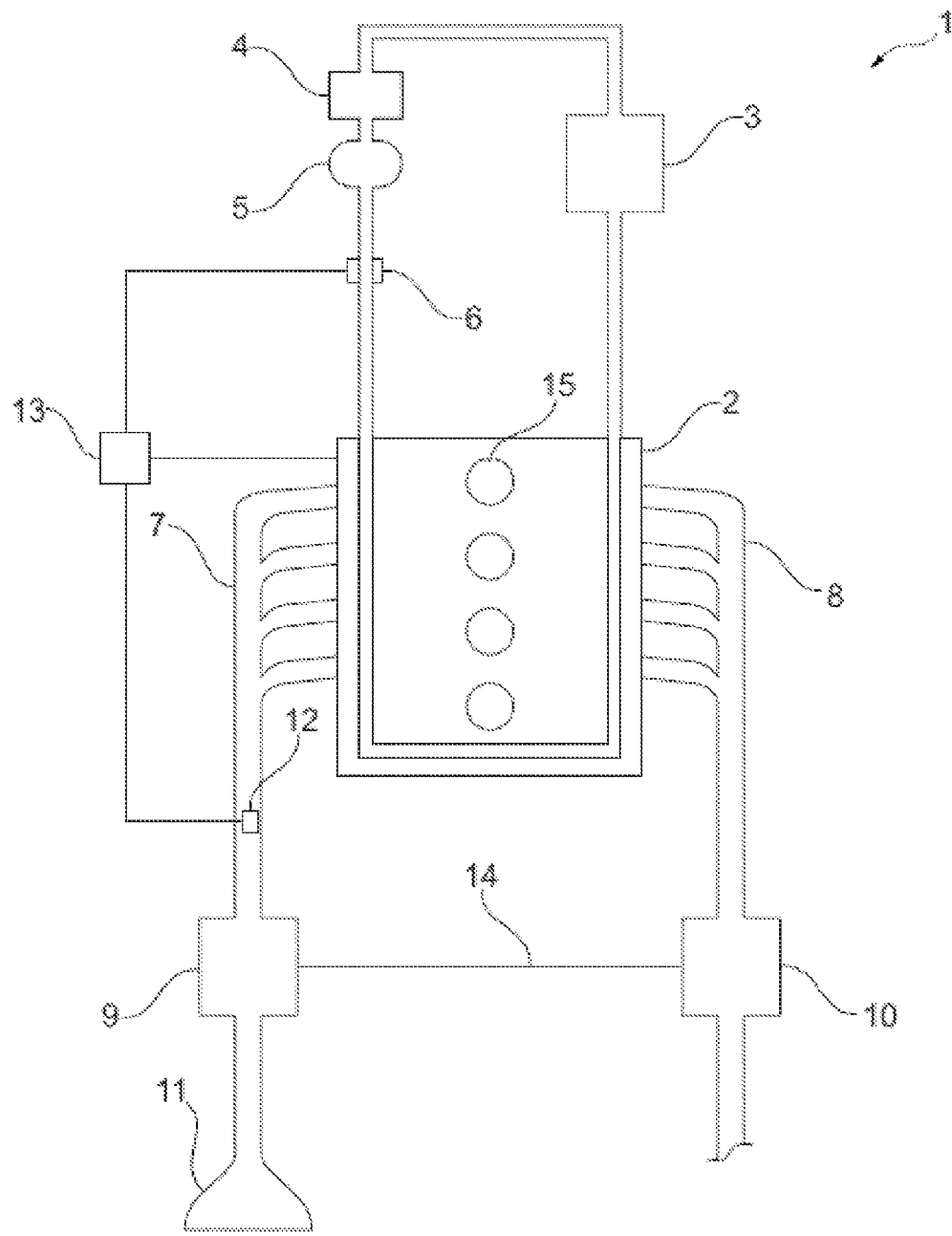
FIG. 1 shows an exemplary embodiment of a motor vehicle according to the present disclosure.

A system and method is disclosed for making operational adjustments to an engine during the engine drive cycle, for example, by changing at least one operating parameter of the engine to reduce the thermal input of the engine. FIG. 1 shows an exemplary embodiment of a motor vehicle according to the present disclosure while FIG. 2 shows a flow chart of an exemplary embodiment of the method based on increasing a charging pressure to reduce a thermal input into the engine coolant in response to a coolant temperature above a predetermined threshold temperature. To illustrate how the method may be implemented in one example scenario, FIG. 3 shows simulated operating sequences according to the method.

FIG. 1 shows an exemplary embodiment of a motor vehicle 1 according to the present disclosure. Motor vehicle 1 is partially shown in FIG. 1 and has an internal combustion engine 2 which drives the motor vehicle 1 and may have, for example, four cylinders 15. The internal combustion engine 2 can be embodied, for example, as a diesel engine of a known type and is cooled by an engine coolant which is fed through the internal combustion engine 2 and a radiator 3 from a coolant reservoir 4 by a coolant pump 5. In the process, the engine coolant heats up as it flows through the internal combustion engine 2 and outputs the absorbed heat again via the radiator 3. The arrangement of the specified components within the cooling circuit can be selected differently than illustrated. Furthermore, a sensor 6 is provided with which a coolant temperature of the engine coolant can be determined by measurement. However, the coolant temperature can also be determined indirectly from one or more other measurement variables and by using mathematical models.

The combustion air for the internal combustion engine 2 is sucked in through an air filter 11 and compressed to a predefinable charging pressure by a compressor 9. The compressor 9 is driven here, for example, by an exhaust turbine 10, which is arranged in an exhaust gas flow of an exhaust manifold 8 and is connected to the compressor 9 by a shaft 14 to form a turbocharger. However, it is also conceivable to drive the compressor 9 directly by the internal combustion engine 2 or electrically. A charge air sensor 12, which measures a temperature of the charge air compressed by the compressor 9, can optionally be arranged in an intake manifold 7. The charge air temperature can, however, also be derived from a measurement of the ambient temperature, the charge air and, if appropriate, further measurement variables. The sensor 6 and the charge air sensor 12 are connected to a control unit 13 which also controls the internal combustion engine 2, wherein the control unit 13 carries out the method according to the present disclosure, for example that in FIG. 2.

FIG. 2 shows an exemplary embodiment of a method according to the present disclosure for operating an internal combustion engine. The method starts in step 202. At step 204 a coolant temperature of an engine coolant of the internal combustion engine is subsequently determined. This can be done, for example, by measurement with a temperature sensor. In step 206 the determined coolant temperature is compared with a predetermined threshold temperature which can be, for example, 110 degrees Celsius. In the subsequent step 210 it is decided whether the determined coolant temperature is higher than the threshold temperature. If this is not the case, the system may either return to step 204, for example, after waiting for a brief time period, or the method may end until control unit 13 determines that it is to be carried out again at a later point in time. However, if the determined coolant temperature is higher than the threshold temperature, in step 212 a charge air temperature of a charge air of the internal combustion engine is determined and in step 214 it is compared with a maximum desired charge air temperature. In step 220 branching occurs as a function of a result of the comparison. If the determined charge air temperature is lower than the maximum desired charge air temperature, the system continues with step 222 where a difference in charging pressure is determined. The difference in charging pressure can be, for example, proportional to a difference between the maximum desired charge air temperature and the determined charge air temperature. In step 224 the charging pressure of the internal combustion engine 2 is increased by the difference in charging pressure determined in this way, which can be carried out, for example, by correspondingly actuating the compressor, and the method is subsequently ended again or the system branches back to step 204 directly or after a waiting time period. In this way, the method further includes determining a difference in charging pressure as a function of the charge air temperature, and increasing the charging pressure based on the difference in charging pressure. In addition, as described herein, vehicle 1 may be configured to increase the charging pressure of the engine while maintaining an engine power that reduces a thermal input to the engine coolant. In contrast, if it was detected in step 220 that the determined charge air temperature reaches or exceeds the maximum desired charge air temperature, the charging pressure is not increased. Instead it is possible, if appropriate after a waiting time period, to branch back to step 204 and the method to be aborted or alternative measures for avoiding overheating of the internal combustion engine to be taken. These alternative measures can comprise, for example, a reduction in the engine power of the internal combustion engine.

Turning now to operation of the vehicle according to the method, FIG. 3 shows simulated operating sequences 300 for the example of a vehicle operating under a heavy load to tow a trailer up a hill. Four plots are shown as a function of time in operating sequences 300, and time increases from left to right. In the top plot, engine load is schematically illustrated. Then, because the method relies upon determining a coolant temperature and/or a charge-air temperature, the second plot schematically shows the coolant temperature while the third plot schematically illustrates charge-air temperature. The bottom plot schematically illustrates the difference in charging pressure ($\Delta P_{CHARGE}$) that is increased according to the exemplary method shown in proportion to the difference between the maximum desired charge-air temperature and the determined charge-air temperature. In this context, a difference in charging pressure is determined as a function of the charge air temperature, and the charging pressure of the internal combustion engine is raised by the difference in charging pressure.

Simulated operating sequences 300 shows three different time periods to illustrate how operational adjustments may be made during the engine drive cycle based on the data collected by a control unit, e.g., control unit 13. For example, first period 302 illustrates a time period when the vehicle begins operation under a heavy engine load that falls below a substantially maximal engine load. Because the vehicle begins ascending up the hill during first period 302, the coolant temperature begins to rise as engine output increases during engine warm up. Then, as the steepness of the hill increases, the engine output further increases as does the charge air temperature. In response, the vehicle makes a first set of adjustments to reduce the thermal input of the engine, which may act to cool the engine when $T_{COOLANT}$ exceeds a coolant threshold temperature but while $T_{CHARGE-AIR}$ falls below a charge-air temperature threshold. A short time later, vehicle 1 traverses a different part of the hill during second period 304. As illustrated, second period 304 is a steeper part of the hill that causes the vehicle to operate at an increased engine output relative to the output of first period 302. Moreover, because the vehicle is already warmed up, the coolant temperature rises quickly to exceed the coolant temperature threshold while the charge air temperature rises above the charge-air threshold. In this scenario, vehicle 1 may make operational adjustments according to the method to reduce thermal input to the coolant while continuing vehicle operations. It is also possible to determine an instantaneous engine power of the internal combustion engine. As described, the at least one operating parameter (e.g., charging pressure) of the internal combustion engine is changed only when the instantaneous engine power of the internal combustion engine is greater than a threshold engine load. This provides the advantage that the response of the internal combustion engine is not changed if the instantaneous engine power is relatively low. As such, third period 306 illustrates the scenario wherein vehicle 1 makes no operational adjustments when the engine load falls below the threshold engine load. The threshold engine load may be selected in such a way that there is no risk of the internal combustion engine overheating because of the low instantaneous engine power. The threshold engine load can also be determined as a function of an instantaneous cooling power of the radiator in some embodiments. For example, the instantaneous cooling power of the radiator can be derived from the temperature of the surrounding air, the velocity and the rotational speed of the fan, which together determine the air mass flow rate. A second aspect of the present disclosure relates to an internal combustion engine having a sensor for determining a coolant temperature of an engine coolant of the internal combustion engine, and a control unit which is connected to the sensor and has the purpose of controlling the internal combustion engine. In this context, the control unit is designed to carry out the method according to the present disclosure.

Continuing with a description of simulated operating sequences 300 in greater detail, first period 302 is now described. First period 302 begins at T0, which may represent an ignition event when the vehicle is turned on. Then, period T0 to T1 represents a warm-up period wherein engine output 310 operates under a low load. During this period, the temperature of engine 2 may increase as vehicle 1 warms-up during operation. At T1, vehicle 1 encounters a steep hill (e.g., greater than 7% grade) that is to be traversed while towing a trailer. That is, vehicle 1 will operate under a heavy engine load in order to navigate the hill during operation. From T1 to T2, the load on the engine rises quickly to a high output (e.g., >90% of capacity) that remains below a substantially maximal allowable engine output, e.g., based on a design specification for the vehicle. During this time period, as the output of engine 2 is increased, coolant temperature 320 and charge-air temperature 330 also rise as engine load is increased. However, because engine 2 is still relatively cool, the coolant temperature and charge-air temperature remain below thresholds 322 and 332, respectively. At T2, engine output 310 reaches a plateau, for example, in response to vehicle 1 exerting a high output while traversing the hill at a substantially constant rate. From T2 to T3, the coolant temperature and charge-air temperature increase as the vehicle operates with an increased engine output. According to the methods, because the coolant temperature falls below coolant threshold 322, control unit 13 makes no operational adjustments as it monitors the engine operations via one or more parameters. At T3, coolant temperature 320 exceeds coolant threshold 322 while charge-air temperature 330 falls below a maximum desired charge-air temperature 332. As noted, to provide cooling to engine 2 by reducing a thermal input, the method may advantageously make operational adjustments rather than reducing engine output. For example, according to the method of FIG. 2, the difference in charging air pressure 340 can be increased in proportion to the difference between the maximum desired charge-air temperature (e.g., 332) and the determined charge air temperature (e.g., 330), that is indicated at 334. However, in particular the degree to which the charging pressure is raised can also be determined as a function of the determined charge air temperature. A first difference in charging pressure is preferably determined for a first charge air temperature, and a second difference in charging pressure is preferably determined for a second charge air temperature which is higher than the first charge air temperature. The second difference in charging pressure is smaller here than the first difference in charging pressure. The difference in charging pressure can be, in particular, proportional to a difference between the charge air temperature and the maximum desired charge air temperature.

As illustrated in FIG. 3, the maximum desired charge air temperature can be a predetermined constant, but in other embodiments it may also depend on a requested engine power or a requested torque and on the rotational speed of the internal combustion engine. This is due to the knowledge that the maximum torque which an internal combustion engine can apply for a determined rotational speed depends on the charge air temperature and drops as the charge air temperature increases. The cause of this is the lower density of charge air and therefore the smaller mass of air passing into the internal combustion engine per charge cycle owing to the relatively high charge air temperature. Therefore, it may be the case that comparatively high requested engine power levels or requested torque levels may be made available if the charge air temperature does not increase above a determined charge air temperature, the maximum desired charge air temperature. In such a case, the charging pressure may not be raised to such an extent that the charge air temperature increases above the maximum desired charge air temperature. Based on the increased charging air pressure, thermal input into the engine coolant may be reduced by raising a charging pressure of the internal combustion engine. Thus, coolant temperature 320 may be reduced as the thermal input into the coolant is reduced. At T4, the engine load is reduced, for example, because the vehicle traverses a part of the route that has a reduced steepness. During this time period, both the coolant temperature as well as charge-air temperature fall below their respective thresholds, which allows for vehicle operation to continue.

Second period 304 occurs at a later time compared to first period 302. As illustrated, engine output 310 is increased such that the output during the second time period is greater than the output during the first time period. This may occur, for example, because the slope of the hill during the second period is greater than the slope of the hill traversed during first period 302. At T5, vehicle 1 begins ascending the steeper hill. Because engine 2 has already warmed up to operating temperature, during the time period from T5 to T6, coolant temperature 320 rises rapidly above coolant temperature 322. Then, from T6 to T7, vehicle 1 makes operational adjustments, for example, by increasing the charge air pressure in proportion to the difference between the maximum desired charge-air temperature (e.g., 332) and the determined charge air temperature (e.g., 330) as described above with respect to the adjustments made during first period 302. Although this adjustment may act to cool engine 2, the engine output may remain high in order to traverse the remaining portion of the steep hill while towing the trailer. As such, T7 represents a point in time when coolant temperature 320 exceeds coolant threshold 322 while charge-air temperature 330 also exceeds the maximum desired charge-air temperature 332. In contrast to operational adjustments made while the charge-air temperature falls below the maximum desired temperature threshold, if it is determined that the charge air temperature reaches or exceeds the maximum desired charge air temperature, according to the method the charging pressure is not increased. Instead, alternative measures may be taken to avoid overheating of the engine 2. One such measure shown in FIG. 3 is a reduction in the power of engine 2. At T7, engine output 310 is reduced to a lower level relative to the output level requested by a vehicle operator prior to T7. In response to the lower output level, coolant temperature 320 and charge-air temperature 330 may also be reduced accordingly. Thereby, the engine power is reduced and the thermal input to the engine is also reduced accordingly, which allows vehicle operation to continue at a reduced rate. As described herein, the methods advantageously allow vehicle operation to be extended before a reduction in power supplied to the engine is imposed during periods of heavy operation.

Third period 306 represents another time period when vehicle 1 is operated under heavy load conditions, but with a low power that falls below a load threshold. As noted above, the at least one operating parameter (e.g., charging pressure) of the internal combustion engine is changed only when the instantaneous engine power of the internal combustion engine is greater than a threshold engine load (e.g., engine load threshold 312). This provides the advantage that the response of the internal combustion engine is not changed if the instantaneous engine power is relatively low. For this reason, third period 306 illustrates an instance when vehicle 1 makes no operational adjustments since the engine load falls below the threshold engine load.

The present disclosure has the advantage that overheating of the engine coolant under a large load when the cooling power is low can be prevented or at least delayed, with the result that a motor vehicle can, for example, tow a large trailer load for a relatively long time, as is the case when traveling uphill with the trailer at a low velocity and therefore when the cooling power is low. Although the present disclosure has been illustrated and described in detail by means of examples of preferred embodiments, the present disclosure is not restricted by the disclosed examples. Variations of the present disclosure can be derived by a person skilled in the art from the exemplary embodiments shown without departing from the scope of protection of the present disclosure as defined in the claims. A further aspect of the present disclosure relates to a motor vehicle having such an internal combustion engine.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an internal combustion engine, comprising:
 determining a coolant temperature of an engine coolant of the internal combustion engine;
 comparing the coolant temperature with a predetermined threshold temperature;
 reducing a thermal input into the engine coolant by increasing a charging pressure of the internal combustion engine via turbocharger compressor operation responsive to a coolant temperature higher than the predetermined threshold temperature, wherein increasing the charging pressure increases a charge air temperature;

determining the charge air temperature, where the charge air temperature is the charge air temperature of a charge air of the internal combustion engine, increasing the charging pressure of the internal combustion engine based on the charge air temperature;

determining a difference in charging pressure as a function of the charge air temperature; and increasing the charging pressure of the internal combustion engine based on the difference in charging pressure.

2. The method according to claim 1, where a first difference in charging pressure is determined for a first charge air temperature, and a second difference in charging pressure is determined for a second charge air temperature higher than the first charge air temperature, the second difference in charging pressure being smaller than the first difference in charging pressure.

3. The method according to claim 2, further including maintaining an engine power when at least one operating parameter of the internal combustion engine is changed.

4. The method according to claim 3, where the at least one operating parameter of the internal combustion engine is changed only when an instantaneous engine power of the internal combustion engine is greater than a threshold engine load.

5. A motor vehicle with an engine and a controller that is configured to:

determine a coolant temperature of an engine coolant of the engine;

reduce a thermal input into the engine coolant by compressing charge air with a compressor of a turbocharger to increase a charging pressure of the engine responsive to a coolant temperature higher than a predetermined threshold temperature, where increasing the charging pressure increases a charge air temperature of the engine, where the charging pressure of the engine is increased based on the charge air temperature of the engine, where a difference in charging pressure is determined as a function of the charge air temperature, and where increasing the charging pressure of the engine is based on the difference in charging pressure as the function of the charge air temperature.

6. The motor vehicle according to claim 5, where a first difference in charging pressure is determined based on a first detected charge air temperature, and a second difference in charging pressure is determined based on a second detected charge air temperature that is higher than the first detected charge air temperature, the second difference in charging pressure being smaller than the first difference in charging pressure.

7. The motor vehicle according to claim 5, where an engine power is maintained responsive to the increased charging pressure.

8. The motor vehicle according to claim 5, where the charging pressure is changed only when an instantaneous engine power of the engine is greater than a threshold engine load.

9. A method for reducing a thermal input of an engine, comprising:

increasing a charging pressure of the engine based on a charge air temperature relative to a maximum charge air temperature responsive to a coolant temperature above a predetermined threshold temperature, the coolant temperature determined based on a sensor, determining a difference in charging pressure as a function of the charge air temperature, and increasing the charging pressure based on the difference in charging pressure.

10. The method according to claim 9, where a first difference in charging pressure is determined at a first charge air temperature, and a second difference in charging pressure is determined at a second charge air temperature higher than the first charge air temperature, the second difference in charging pressure being smaller than the first difference in charging pressure.

11. The method according to claim 10, where increasing the charging pressure of the engine maintains an engine power while reducing a thermal input to an engine coolant.

12. The method according to claim 11, where the charging pressure of the engine is changed only when an instantaneous engine power of the engine is greater than a threshold engine load.

* * * * *